Sept. 8, 1970   J. H. AUER, JR., ET AL   3,528,054
DIGITAL CONTROL SYSTEM FOR TRAFFIC SIGNALS
Filed Feb. 28, 1966   3 Sheets-Sheet 2
FIG. 2   LINE TERMINAL UNIT
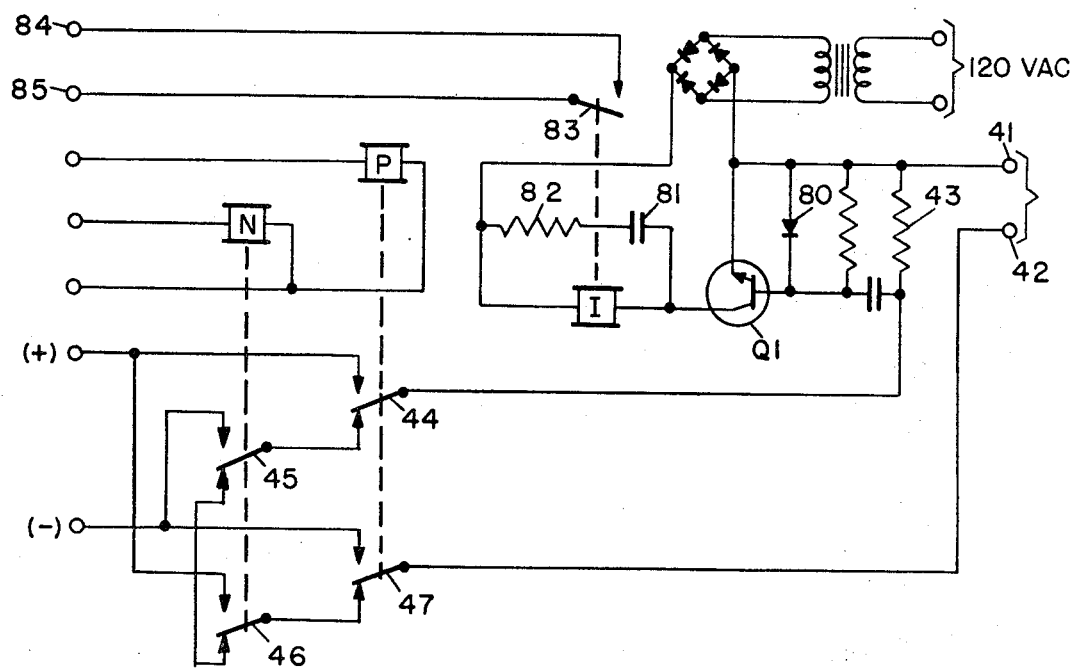
FIG. 4
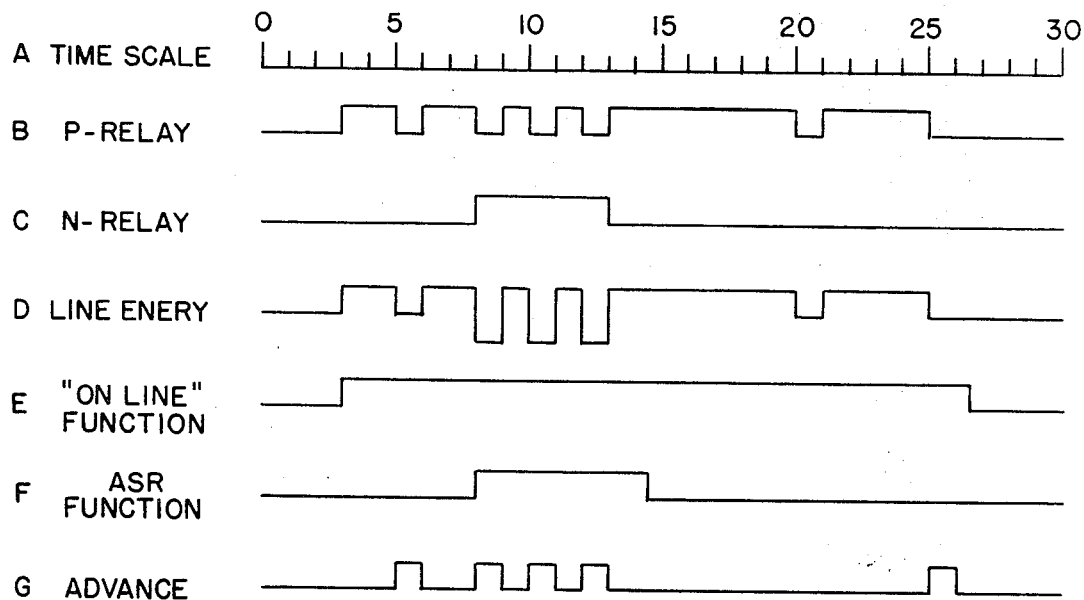
INVENTORS
J. H. AUER AND L. A. ROSS
BY
Forest D. Hitchcock
THEIR ATTORNEY

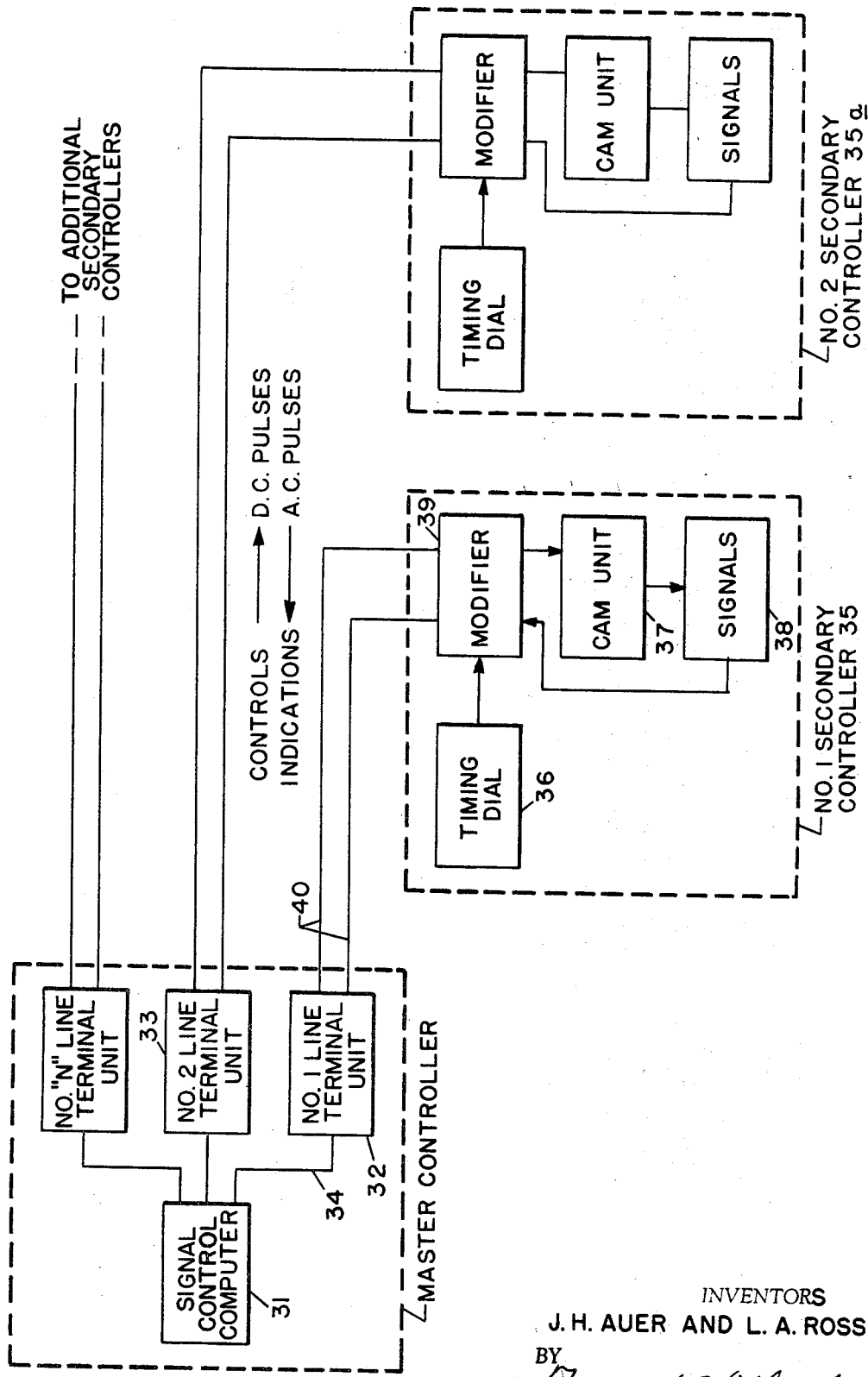

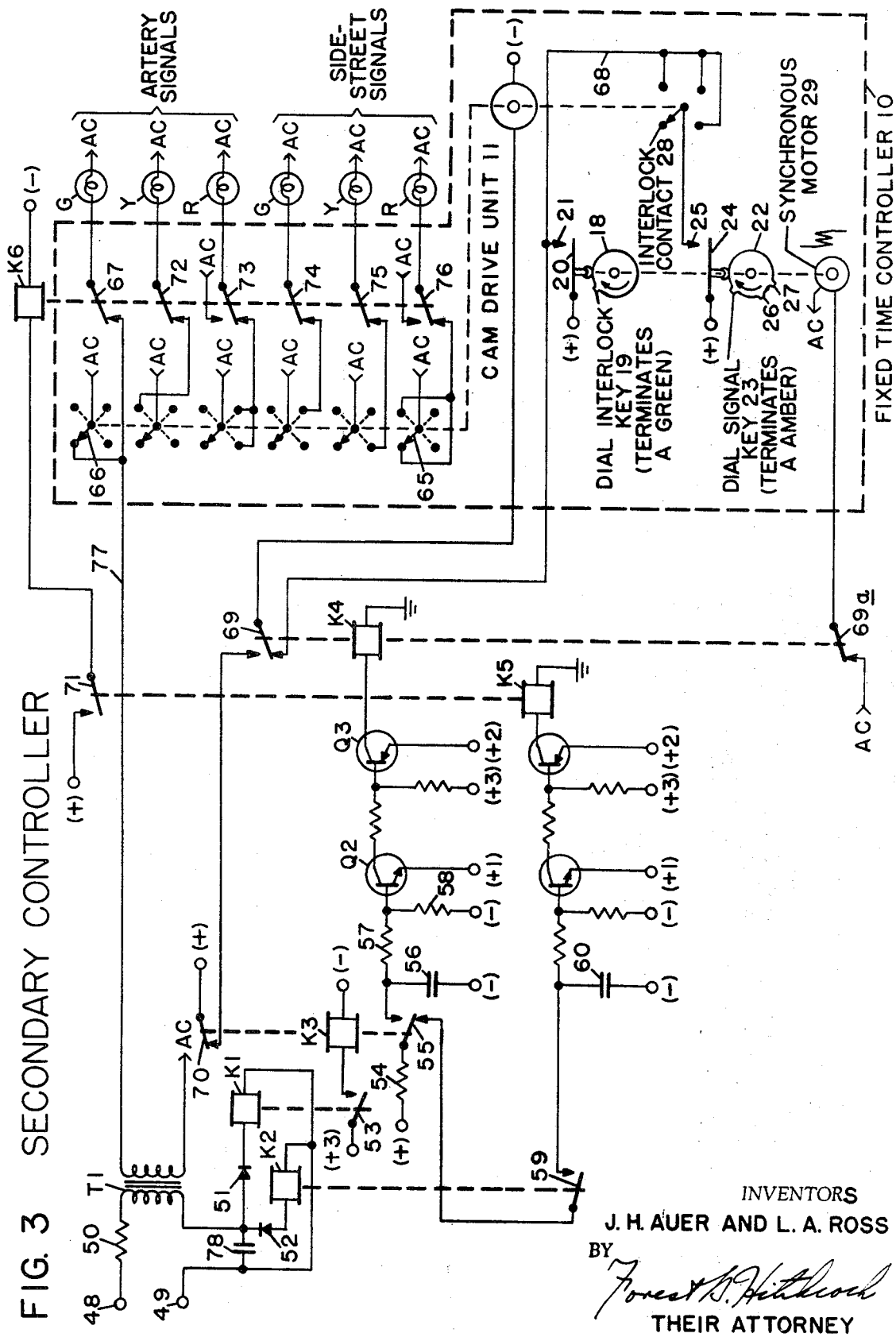

United States Patent Office 3,528,054
Patented Sept. 8, 1970

3,528,054
DIGITAL CONTROL SYSTEM FOR
TRAFFIC SIGNALS
John H. Auer, Jr., Fairport, and Lyle A. Ross, Rochester, N.Y., assignors to General Signal Corporation, Rochester, N.Y., a corporation of New York
Filed Feb. 28, 1966, Ser. No. 530,687
Int. Cl. G08g 1/07
U.S. Cl. 340—35                                    12 Claims

ABSTRACT OF THE DISCLOSURE

A system wherein a master traffic actuated controller establishes control over one or more local signal controllers and transmits information to each local signal controller via a pair of wires. A transmitted signal of one polarity renders the local controller responsive to the master and interruptions of the signal having less than a predetermined duration convey the desired control information. A transmitted signal of opposite polarity controls the local controller to display a desired signal pattern irrespective of the information conveyed by interruption of the first polarity signal.

This invention relates to a digital control system for traffic signals and more particularly pertains to a system in which a plurality of secondary controllers, each comprising an interval register and a timer, is independently controlled from a master controller by transmitting a digital control signal from the master controller to each secondary controller. The invention is particularly concerned with apparatus which is intended to be operatively connected to a conventional controller employing a timing dial and cam switch to permit such a secondary controller to be used in a digital code control system.

In the prior, copending application of John H. Auer, Jr., et al. Ser. No. 529,156, filed Feb. 21, 1966, and assigned to the assignee of the present invention, there is disclosed a system for the control of a plurality of intersection or secondary controllers from a master controller by means of a digital code control system. In that system, the master controller periodically receives data regarding traffic conditions from a number of vehicle detectors, and once each second (or other suitable brief interval) the master controller formulates a new code message for each secondary controller in the system. Each code message designates the particular signal interval to which the associated secondary controller is to be operated throughout a brief segment of time beginning with the reception of the message and extending until the reception of another message a short time later. In other words, once each second the master controller determines the particular combination of signal indications that is to be displayed by each secondary controller for the immediately following one-second interval. When the same signal interval is to be in effect for a time at any signal controller, the master controller sends the same message repeatedly, and changes the coded message only when a different signal interval is to be put into effect.

The digital control system thus described has complete flexibility in operation since any sequence of signal operations may be put into effect by the master controller, and there is thus avoided entirely the problems which have previously existed in the operation of mechanical controllers when it is desired to provide for a different sequence of operation than originally programmed in the controller. This may occur, for example, when a vehicle-actuated controller is provided and it is desired to operate from an existing phase to another phase on which there has been a vehicle or pedestrian call, while at the same time skipping some other phase on which no vehicle or pedestrian call has been received.

Of course, it will be recognized that a system of the type just described is relatively expensive since the installation of such a system requires that all existing controllers be removed and be replaced by new controllers which are especially adapted to respond to the digital code messages received periodically from the master controller.

In recognition of the foregoing considerations, we have provided a system which makes possible the continued use of conventional, mechanical controllers employing a timing dial and cam switch, but with the master controller providing all the necessary computing and timing functions for the system and transmitting to each individual secondary controller in the system a code signal effective to operate the cam switch from one position to the next at intervals determined by the master controller. Although the system does not have the complete flexibility of operation of that disclosed in the aforementioned application Ser. No. 529,156 filed Feb. 21, 1966, it does nevertheless provide a highly versatile and flexible system. For example, the system of this invention provides means whereby any steps of the interval register or cam switch of a secondary controller may be skipped at will. As a result of this feature, it is possible to skip any selected phase in a multi-phase controller, and the significance of this feature will be apparent to one skilled in the art. The system also provides for the transmission of a distinctive indication from each intersection controller to the master controller to indicate to the latter when the secondary or intersection controller is on a predetermined step of its interval register. This feature is of importance since it permits the computer at the master controller to keep informed as to the operating condition and operating interval of each of the secondary controllers, and this greatly facilitates the proper coordination of the various secondary controllers into the system operation when the operation is altered from standby operation to "on-line" operation. Also, since the cam switch unit in each secondary controller is operating from one step to the next in response to a pulse signal from the master controller, the transmission of the indication, described above, to the master controller makes it possible for the latter to determine once each cycle, during "on-line" operation, that the cam switch unit is "in phase" with the called-for signal interval at the master controller.

Described briefly, the system provides for the transmission of digital, direct-current code pulses from the master controller to each intersection or secondary controller and also provides for the transmission of a distinctive alternating-current signal from each secondary controller back to the master controller. With respect to the direct-current code transmitted from the master controller to each intersection controller, such code is formed selectively of zero signal, positive polarity and negative polarity direct current. A signal of positive polarity is recognized by each secondary controller as denoting "on-line" operation as opposed to standby operation. The positive polarity signal may be briefly interrupted to thereby provide a pulse which will advance the interval register or cam switch one step. Such brief interruptions of the positive polarity of line energization to effect a stepping pulse do not affect the "on-line" function detection at the secondary controller.

As mentioned previously, the system may provide for the stepping of an interval register at any intersection controller through any unwanted intervals, and this is accomplished throughout an interval when, in response to a code from the master controller, the intersection controller is controlling the associated signals to display an ALL-RED signal indication. Thus, the advancement of the interval register during such time that the associated signals all display a RED indication, irrespective of the operative condition of the interval register, will not produce any undesired signal operation as the interval register skips through the unwanted steps. To effect this mode of operation, the master controller sends a direct-current signal to the selected secondary controller of negative polarity, and this condition is detected at the secondary controller by the operation of the signals to an ALL-RED indication independently of the interval register or cam switch. This negative signal may be in the form of negative pulses without affecting the ALL-RED condition detection, and these negative pulses will step the interval register through the unwanted steps, one step at a time, in response to each negative pulse.

It is thus an object of the present invention to provide a system for the control of a plurality of secondary intersection controllers from a master controller by transmitting a distinctive code from the master controller to each secondary controller at the time of desired change of signal interval at each secondary controller.

It is another object of the invention to provide a system wherein a plurality of intersection controllers, each being of a conventional type including a timing dial and cam switch, is advanced from one signal interval to the next at desired times in response to a code message received from a master controller.

It is a further object of the invention to provide a system for the control of a plurality of traffic signal controllers from a master controller in which each intersection controller can be advanced at will through any unwanted signal intervals in response to a distinctive code received from a master controller.

It is an additional object of this invention to provide apparatus for modifying a conventional signal controller employing a timing dial and cam switch in order to permit operation of the signal controller in response to distinctive code pulses obtained from a master controller.

Other objects, purposes, characteristic features of the invention will in part be obvious from the drawings and in part be pointed out as the description of the invention progresses.

In describing the invention, reference will be made to the accompanying drawings in which like reference characters designate corresponding parts in the several views and in which:

FIG. 1 is a block diagram of the system of the present invention;

FIG. 2 is a circuit diagram of the line terminal unit of FIG. 1;

FIG. 3 is a circuit diagram of a typical secondary controller of the present invention; and FIG. 4 is a diagram which illustrates the distinctive code that is transmitted from the master controller to each secondary controller.

In the drawings, the symbols (+) and (−) indicate connections to the positive and negative terminals, respectively, of a source of direct-current power. Also, the symbols representing an arrow tail and head, each associated with legend "A.C." denote connections to opposite terminals of a source of alternating-current power.

Referring to FIG. 1, the master controller is shown as including a signal control computer 31 which is connected to a plurality of line terminal units, one of which is provided for each secondary or intersection controller in the system. Thus, a No. 1 line terminal unit 32 is shown as being associated with a No. 1 secondary controller 35, and a similar such unit 33 is provided for the No. 2 secondary controller 35a. The lead 34 connecting the signal control computer 31 with line terminal unit 32 is intended to designate an operative connection between these two units which provides for the transmission of control data from the computer 31, through the line terminal unit 32 to the associated secondary controller 35, and is also operative for the transmission of indications to the signal control computer 31 from the secondary controller 35 through the same line terminal unit 32. Insofar as the transmission of indications is concerned, it is desired that the signal control computer 31 be aware of the time of operation of any controller to a particular signal interval to facilitate the transferral of operation of any controller from standby operation to "on-line" operation and to prvide a periodic check that the cam switch unit is properly in phase with the signal interval then called for by the master controller, that the signal control computer 31 be aware of the existing operative condition of the secondary controller before "on-line" operation starts and before it sends a message to the controller to operate it to the next signal interval.

The connection provided between any line terminal unit such as unit 32 and the corresponding secondary controller 35 may comprise a two-wire telephone line which is capable of transmitting direct-current pulses of both negative and positive polarity and also alternating-current pulses to comprise an indication signal.

Each secondary controller such as the controller 35 of FIG. 1 comprises a timing dial 36, an interval register which may comprise a cam switch unit 37, the traffic signals 38 which are selectively energized from the cam switch unit, and a modifier 39 which has the function of modifying operation of the otherwise conventional secondary controller to permit it to operate in the intended manner from the code received over the telephone line 40 from the associated line terminal unit 32.

FIG. 2 illustrates a typical line terminal unit. The unit comprises two relays P and N whose operation is controlled by the signal control computer 31, and these relays may be energized either alternately or concurrently. The selective operation of these relays controls the application of pulses of direct current to terminals 41 and 42 which connect to the line wires 40 of FIG. 1.

When both relays P and N are dropped away as shown in FIG. 2, a short circuit is provided across the terminals 41 and 42 because terminal 41 is then connected through resistor 43, through back contact 44 of relay P, back contact 45 of relay N, back contact 46 of relay N, and back contact 47 of relay P to terminal 42.

Assume now that relay P is picked up, whereas relay N is dropped away. Under these circumstances, terminal 41 is connected through resistor 43 and through front contact 44 of relay P to the (+) terminal. At the same time, terminal 42 is connected through front contact 47 of relay P to the (−) terminal. Thus, the terminals 41 and 42 are energized with direct current and the polarity is such that terminal 41 is positive potential relative to terminal 42. This polarity will hereafter be referred to as "positive" line energization.

If relay N is picked up but relay P is dropped away, terminal 41 is connected through resistor 43, through back contact 44 of relay P and front contact 45 of relay N to the (−) terminal. At that time, terminal 42 is connected through back contact 47 of relay P and front contact 46 of relay N to the (+) terminal. Under these circumstances, therefore, terminals 41 and 42 are again energized with direct current but of opposite polarity to that just described when relay P is picked up but with relay N dropped away in that terminal 41 is now at a negative potential relative to terminal 42. This polarity will hereafter be referred to as "negative" line energization.

If both relays P and N are picked up, it will readily be apparent that the energization of terminals 41 and 42 is the same as it is when only relay P is picked up but relay N is dropped away. Therefore, under these circumstances, terminal 41 is again of positive polarity relative to terminal 42.

The remainder of the apparatus associated with the line terminal unit of FIG. 2 and comprising transistor Q1 and indication relay I is associated with the reception of an indication signal from the associated secondary controller. The description of this portion of the line terminal unit will be presented in greater detail subsequently.

Having described the effect on the line wires of the selective energization of relays P and N, the code chart of FIG. 4 will now be explained before proceeding with the description of a typical intersection controller as shown in FIG. 3. Thus, referring to FIG. 4, line A thereof comprises a time scale which, in the assumed example considered here, is divided into one-second intervals. Of course, shorter or longer time intervals may be used. However, for convenience, various times on the time scale will hereafter be referred to as "time 8," "time 11," and it will be understood that reference is being made to corresponding scale markings on the time scale of line A.

Line B illustrates a typical pattern of energization of the P relay in response to the signal control computer 31. Thus, relay P is shown as being normally de-energized but is energized at time 3 and remains energized from then until time 5. From time 5 to time 6 on the time scale, relay P is de-energized; thereafter, relay P is steadily energized from time 6 to time 8 but is then de-energized briefly on three successive occurrences, from time 8 to time 9, time 10 to time 11, and again from time 12 to time 13, thereby providing three successive periods of de-energization of relay P throughout the time from time 8 until time 13. Thereafter, relay P is steadily energized until time 20 at which time it is again de-energized for a one-second interval. At time 25 relay P is again de-energized and remains de-energized for a subsequent period thereafter.

With respect to relay N (see line C), this relay is normally de-energized but is energized from time 8 through time 13 and is then thereafter again de-energized.

The effect of this selective pattern of energization of relays P and N in its effect upon the energization of the line wires is shown in line D. Thus, whenever relay P alone is energized, the line energization is positive in accordance with the description already given in connection with FIG. 2. When only relay N is energized, the line energization is negative. When both relays P and N are energized, positive line energization results, also as previously described in connection with FIG. 2. As will subsequently become evident, the presence of positive energization on the line wires connected to a secondary controller has the function of controlling the secondary controller for "on-line" operation as opposed to standby operation. In "on-line" operation, the advance of the interval register or cam switch is in response to pulsed energy appearing on the line wires so that the controller is then subject to control of the master controller, whereas in standby operation, the secondary controller is advanced from one interval to the next entirely in accordance with the operation of the timing dial. To illustrate this, line E of FIG. 4 shows that the "on-line" function comes into effect at time 3 when the first pulse of positive energization appears on the line. It will be noted that the "on-line" function remains steadily present until sometime between time 26 and time 27. This is because the positive line energization ends at time 25 when the P relay is dropped away as shown at line D. During the interval from time 3 until time 25, the positive line energization is intermittently interrupted as the line energy at times goes to zero and at other times goes negative in response to energization of the N relay alone. Nevertheless, it can be seen that each such removal of the positive line energization occurs for only one time unit as, for example, from time 8 to time 9, or from time 10 to time 11. Such a brief interruption in the positive line energization will not remove the "on-line" function as shown at line E. However, if the positive line energization is absent for a period in excess of one time unit, i.e. as long as about 1.5 time units, then the "on-line" function will be removed. It is for this reason that the "on-line" function is shown as terminating at about time 26.5 in FIG. 4, line E, in response to the de-energization of the line at time 25 as shown at line D. A shorter period of line de-energization such as one occurring for only one time unit will not remove the "on-line" function.

With reference to FIG. 3, when relay K4 is dropped away, during standby operation, back contact 69a is closed so that an A.C. power circuit is closed to energize motor 29. However, during "on-line" operation, when relay K4 is picked up, this contact is open; thus, motor 29 is de-energized.

As previously described in a general manner, one function of the system is to provide for the skipping of unwanted steps of the interval register and to accomplish this in a manner which will not produce extraneous signal indications. In general, this is accomplished in the system of this invention by providing at desired points in the signal cycle, i.e. where the advance of the cam switch through unwanted steps is desired, an ALL-RED signal interval and then to operate the interval register rapidly through the undesired steps during such ALL-RED interval. Since this occurs at a time when all signals are red, this is known for convenience sake therein as the "ASR" function, i.e. the control of all signals to the red condition to permit the rapid stepping of the cam switch through the unwanted steps.

The ASR function is put into effect at any signal controller by transmitting to such controller a period of negative line energization. Such negative line energization is brought about by energization of the N relay as shown in FIG. C. At time 8 in FIG. 4, the N relay is picked up, and this brings about an energization of the line with a negative polarity of direct current. As shown at line F, the negative line energization immediately initiates the ASR function. Of course, it is desirable that stepping of the interval register through the unwanted steps takes place in response to specific commands from the signal control computer, and this is accomplished by intermittently de-energizing the P relay during the time that the ASR function is in effect. Thus, the de-energization of the P relay at time 8 produces one advance of the interval register, and second and third interruptions of the positive energy occur at times 10 and 12 as the P relay is again de-energized. As will later be explained, each such removal of positive line energization results in the application of a stepping pulse to the interval register or cam switch, and three such advances occur throughout the interval from time 8 to time 13 in FIG. 4. Throughout this time also, the ASR function is in effect as shown at line F to ensure that all the traffic signals will be controlled to display a RED signal indication during this time so that no undesired signal indications will be given as the cam switch advances through the unwanted steps.

The manner in which the foregoing functions are accomplished in the secondary controller will be understood from reference to FIG. 3.

In FIG. 3, terminals 48 and 49 are those which connect to the line wires 40 connecting the secondary controller to the master controller. Terminal 48 is connected through resistor 50 through the primary winding of transformer T1, and through diode 51 to one terminal of relay K1, and the other terminal of this relay is connected directly to terminal 49. Consequently, positive energization of the line causing terminal 48 to be positive relative to terminal 49 results in a flow of current through diode 51 in the forward direction and through the winding of relay K1 to energize this relay. In a similar manner, the opposite polarity of line energization results in a flow of current through the winding of relay K2 and through diode 52 in the forward direction so that this relay K2 will be energized.

In FIG. 3 the symbols (+1), (+2) and (+3) refer to different levels of positive voltage. The numbers 1, 2 and 3 of these symbols are not indicative of the magnitude of the voltages but are merely used as distinguishing between the voltages employed. The negative side of the source is merely indicated by (—), but the positive side is indicated by (+3). The symbols (+1) and (+2) denote different intermediate voltage levels appropriately used for bias purposes.

Relay K3 is a repeater relay of K1 since each picking up of relay K1 closes its front contact 53 to apply energy to the winding of relay K3. Each time that relay K3 picks up, energy is applied through resistor 54 from the (+3) source and through front contact 55 of relay K3 to the upper terminal of capacitor 56 whose lower terminal is connected to a negative source of voltage represented by the symbol (—). If there has been no actuation of relay K3 for some time previous, then capacitor 56 will have become discharged through resistors 57 and 58. Therefore, the voltage at the base of transistor Q2 is substantially that of the (—) source. Since the emitter of this N-P-N transistor is positively biased by being connected to the (+1) voltage source, transistor O2 is normally biased to cut off. Because of this cut off condition, the base of transistor Q3 is substantially at the voltage of the (+3) source, and this voltage is slightly above the potential of the emitter connected to (+2). Because of this, transistor Q3 is also cut off so that relay K4 is normally de-energized.

When relay K3 first picks up in response to a pulse of positive line energization, capacitor 56 charges quickly because of the low value of resistance provided by resistor 54. The resulting increase in voltage at the base of transistor Q2 turns this transistor on, and the resulting increase in potential at the base of transistor Q3 turns that transistor on as well so that the winding of relay K4 is energized and this relay now picks up. If at any time relay K3 drops away because of the removal of positive line energization, front contact 55 of this relay opens so that capacitor 56 can now only discharge through the relatively high resistance provided by resistors 57 and 58 in series. Because these resistors have a quite high value of resistance, capacitor 56 can discharge only slowly and therefore the above-described conditions at the various terminals of transistors Q2 and Q3 remain in effect for some time and relay K4 remains picked up. The various parameters are so adjusted that relay K4 will remain picked up for approximately one and one-half time units on the time scale of line A, FIG. 4, after front contact 55 opens. Therefore, momentary interruptions of the positive line energization which do not exceed about one time unit in length will not have any effect upon relay K4 which will remain continually picked up.

A similar circuit is provided for the control of relay K5. Whenever the line is energized with negative polarity direct current, relay K2 is picked up but relay K1, and thus also relay K3, are dropped away. Under these circumstances, a circuit is completed from (+), through resistor 54, back contact 55 of relay K3 and front contact 59 of relay K2 to the upper terminal of capacitor 60. This circuit completes a charging circuit for capacitor 60, and the effect of charging this capacitor is to pick up relay K5. The circuit for the control of relay K5 is identical to that provided for relay K4 so that negative line energization will result in the picking up of this relay, whereas intermittent interruptions in such negative polarity of line energization not exceeding about one time unit in length will not affect relay K5 which will remain picked up.

FIG. 3 also illustrates a typical mechanical fixed-time controller 10 having a cam drive unit 11, a synchronously-driven dial comprising a dial interlock key 19 on dial 18 and a dial signal key 23 on dial 22, with the dial driven by a synchronous motor 29. The cam driven unit 11 is capable of operating to a plurality of discrete positions, moving from one step to the next in response to each pulse of electrical energy applied thereto. The cam unit comprises also a plurality of contacts each of which controls the energization of a respective signal lamp. To facilitate the illustration of the operation of the controller, the various contacts of the cam drive unit are shown diagrammatically in FIG. 3 as, for example, by contact 65 which is operable to any one of four different positions and which is shown as completing a circuit to energize a RED signal lamp for the side street phase in two of its four different positions.

The cam unit is shown in FIG. 3 in the condition in which the artery GREEN signal is being displayed and the side street RED signal also displayed, Thus, contact 66 is shown as being in a position in which a circuit is-completed to energize the artery GREEN signal lamp through a back contact 67 of relay K6. On each of the positions of the cam unit other than the one shown in FIG. 3, operation of the cam unit to the next position is accomplished through the momentary closure of contacts 24 and 25 in response to rotation of the dial 22. This dial 22 has a key 23 which actuates movable contact 24 at a predetermined point in the rotation of the dial to close contacts 24 and 25 and thereby provide a pulse of energy on wire 68, and through back contact 69 of relay K4 to the cam drive unit 11. It is apparent, however, that the cam unit cannot be operated out of the artery GREEN position in which it is shown in FIG. 3 in response to rotation of dial 22 since no circuit can be completed at such time to wire 68. Instead, actuation of the cam drive unit 11 is now dependent upon the closure of contacts 20 and 21 in response to the actuation of a dial interlock key 19 on dial 18. When the key 19 reaches its uppermost position in response to slight clockwise rotation from the position shown in FIG. 3, these contacts 20 and 21 are momentarily closed so that a pulse of energy is provided through back contact 69 of relay K4 to cam drive unit 11 to advance it from the artery GREEN condition to the next clockwise contact position in which the artery YELLOW signal is illuminated. Once it is out of the artery GREEN position, further actuations of the cam drive unit occur as dial 22 rotates further in the clockwise direction so that additional actuations occur as keys 23, 26 and 27 in sequence actuate contacts 24 and 25. In this way, desired, synchronism between the dial and the cam unit is maintained since, for each revolution of the cam unit, operation out of the artery GREEN position can be obtained only when the dial is in a particular condition in which its dial interlock key 19 closes contacts 20 and 21.

The description presented thus far of the operation of the controller 10 has assumed standby operation in which the cam unit is operated entirely in response to the dial in accordance with a previously arranged program which is determined by the positions of the dial signal keys around the circumference of the dial key 22. According to the description presented, it was evident that the application of pulses to the cam drive unit 11 to operate it from one step to the next was dependent upon back contact 69 of relay K4 being closed. When relay K4 is picked up, the circuit just described is opened and the actuation of the cam drive unit is then dependent upon the receipt of pulses from the master controller in a manner to be described.

Referring to FIG. 4, it is noted that until time 3, no positive line energization has been present so that there is no "on-line" function in effect as indicated at line E. This comes about because the continued de-energization of relay K1, and also K3, causes relay K4 to be de-energized so that its back contact 69 is closed with the result that operation of cam drive unit 11 is dependent upon the mechanical dial. However, at time 3, relay K4 picks up and closes front contact 69 so that the application of input pulses to the cam drive unit 11 is now dependent upon the actuation of relay K1 and its associated contact 70.

At time 5 in FIG. 4, the P relay is de-energized and this results in the removal of positive line energization. The result of this, in the circuit of FIG. 3, is that relay K1, which was picked up at time 3, is now dropped away at time 5 to close its back contact 70 and apply a pulse of energy to cam drive unit 11. This advances the cam unit to the next step. At time 6, relay K1 picks up again and removes the energization from the cam drive unit.

It can thus be seen how the cam drive unit 11 may be stepped from one interval to the next merely by momentarily interrupting the positive line energization which is normally in effect to provide the "on-line" function. Whenever the master controller determines by means of its signal control computer 31 that any existing signal interval is to be terminated and the next interval placed in effect, it merely controls the associated P relay to be de-energized for a period of one time unit in FIG. 4, thereby removing the positive line energization and completing an energization circuit for the cam unit through back contact 70 of relay K1.

Assume now that it is desired to operate the secondary controller through several intervals without displaying the combination of signal indication associated with such intervals. Ordinarily, of course, this not done with a simple two-phase controller of the type which has been illustrated for convenience in FIG. 3. Normally, such skip-phase operation is effected only when a multi-phase controller is involved as previously described. Nevertheless, this feature of the present invention can readily be illustrated by the apparatus of FIG. 3.

To skip any unwanted intervals, the N relay at the master controller is energized as previously described. Line C of FIG. 4 shows this as occurring at time 8. Concurrently with the picking up of relay N, the associated P relay is released so that only the N relay is energized for the first one-second interval. It will be remembered that energization of the N relay alone, and not the P relay, results in negative line energization. In FIG. 3, this means that relay K2 is now picked up, whereas relay K1 is dropped away. Of course, it will be noted in FIG. 4 that relay K1 will remain dropped away for only about one second and thus there will be no opportunity for relay K4 to drop away. However, the picking up of relay K2 with relay K3 dropped away means that relay K5 will now be energized in accodance with the description previously given, and this will result in the closure of the front contact 71 of this relay which completes a circuit to energize relay K6. With relay K6 energized, each of the back contacts 67 and 72-76 is now open so that no circuit can be completed to energize any of the signal lamps from the various contacts associated with the cam drive unit 11. However, it will be noted that with respect to both the artery and side street RED signal lamps, both of these will now be energized through circuits completed respectively through front contact 73 and front contact 76 of relay K6. Thus, both the artery and side street signals now are RED, and it is now possible for the cam unit to be operated rapidly through the unwanted intervals without producing any effect upon the operation of the signals.

The removal of positive line energization and the application of negative line energization instead at time 8 in FIG. 4 also has the effect of de-energizing relay K1 and relay K3 as well. This means that back contact 70 of relay K1 is now closed so that a pulse of energy is applied to cam drive unit 11 to operate it to the next position. At time 9, the P relay is again energized to provide positive line energization, and this has the effect of picking up relay K1 and opening the circuit to the cam drive unit 11 through now open back contact 70. This in effect, releases the cam drive unit 11 so that the release of relay K1, which occurs again at time 10 when the P relay is again de-energized and negative line energization results, will permit the actuation of the cam drive unit 11 to a further step. As shown in FIG. 4, three successive occurrences of the de-energization of relay P occur during the continued energization of relay N, and each such de-energization of relay P has the effect of advancing the cam drive unit 11 one further step so that three successive steps can be taken by the cam drive unit during the time that the N relay is steadily energized to provide the ASR function.

As previously mentioned, it is desired that the master controller be repeatedly informed as to the operative condition of each controller, and this is accomplished by informing the master controller when each individual intersection controller reaches the artery GREEN interval. To accomplish this, the circuit of FIG. 3 shows that a connection is provided from the source of alternating-current energy, through contact 66 in the cam drive unit, over wire 77, and through a winding of transformer T1 to the opposite terminal of the alternating-current source. By reason of this connection, the primary winding of transformer T1 is energized with alternating current whenever the cam unit is in the operative condition in which it will ordinarily provide for energization of the artery GREEN signal. The induced secondary voltage appearing across the transformer secondary winding is applied to terminals 48 and 49, being applied directly to terminal 48 through resistor 50, and to terminal 49 through by-pass capacitor 78 which is provided principally for the purpose of ensuring that the alternating-current energy will not go through the windings of relay P1 and P2.

Alternating-current signal indicative of the artery GREEN condition is applied over the line wires from the secondary controller to the master controller and thus appears at terminals 41 and 42 of FIG. 2. When either or both the P and N relays are picked up, this AC signal appears across the DC power supply and resistor 43 in series. Since the DC power supply has a low impedance at 60 c.p.s., the AC signal appears almost completely across resistor 43. Whenever both relays P and N are dropped away, terminal 42 is connected through the various back contacts of the P and N relays to the lower terminal of resistor 43, and therefore the alternating current signal appearing on the line wires will also appear across the resistor 43 whenever both relays P and N are dropped away. The alternating current signal is passed through the series capacitor and is half-way rectified by diode 80, and the resulting voltage appearing between the emitter and base of transistor Q1 serves to turn this transistor on, thereby causing collector current to flow through the winding of relay I and pick this relay up. A capacitor 81 and resistor 82 are connected in series across the winding of relay I to provide a slow release characteristic for this relay, thereby ensuring that relay I will remain picked up even though it is only energized during approximately half of each cycle of 60 cycle signal. When relay I is picked up, a circuit is completed through its front contact 83 to bridge the output terminals 84 and 85 which connect to the signal control computer 31 and thus provide an indication at the master controller of the fact that the associated secondary controller is in the artery GREEN condition.

It should be noted that the circuit of transistor Q1 and relay I is powered by its own transformer and rectifier organization. This provides isolation so that many separate line terminal units may be used together with one direct current line power supply.

When a change is made in the position of either the relay P or the relay N, the direct current change in line signal is coupled through the capacitor to the base of transistor Q1 and may cause relay I to assume an incorrect position for a short time interval. To avoid misreading such indication, the computer should never interrogate the contacts of relay I immediately after causing a change of status of either relay P or relay N. In practice, the computer actually interrogates just prior to issuing new commands.

In the foregoing description, various polarities of line energization have been assumed; however, it will be apparent that other combinations of different signals may be employed to effect the functions set forth. Also, although the system has been described as one which has the feature of permitting the secondary controller to be operated through unwanted steps during an all signal RED interval, it should be understood that this function can readily be eliminated to provide a simpler and thus somewhat more economical secondary controller apparatus.

Having described a digital code control system for traffic controllers, we wish it to be understood that various modifications and alterations may be made to the specific embodiment shown without departing from the spirit or scope of our invention.

What is claimed is:

1. A traffic control system comprising in combination, a traffic signal controller including multi-position switching means operable in each position to energize a selected combination of signal lamps, timing means for operating said switching means from one condition to the next at predetermined intervals, and alternate means for operating said switching means at desired intervals independent of said timing means, said alternate means comprising code transmitting means operatively connected to said controller via a pair of wires, said code transmitting means selectively energizing said pair of wires with steady energy and also at times momentarily deenergizing said pair of wires, and control means at said controller responsive to said steady energization of pair of wires to control said switching means to be responsive to said alternate means rather than said timing means and being also responsive to the momentary removal of said steady energization to operate said switching means from one position to the next one step at a time in response to each said removal, said last-named means being further responsive to the continued removal of said energy for a time substantially longer than said momentary removal thereof for controlling said switching means to be responsive to said timing means rather than said alternate means.

2. The system of claim 1 in which said code transmitting means selectively energizes said pair of wires with steady direct current of a selected polarity and at times momentarily removes said direct current from said pair of wires.

3. The system of claim 2 in which said controller further includes means for selectively energizing said pair of wires with alternating current during the interval that said switching means is in a predetermined condition, and means operatively connected to said pair of wires and responsive to the alternating-current energization thereof for indicating said predetermined positions.

4. The system of claim 1 in which said control means includes means responsive to said steady energization of said pair of wires for operatively disconnecting said switching means from said timing means and operatively connecting said switching means to means responsive to said momentary removal of said steady energization for operating said switching means from one position to the next.

5. The system of claim 2 in which said code transmitting means is operative to selectively energize said pair of wires with opposite polarity signals of direct current alternately, said control means being responsive to energization by one of said signals for advancing said switching means and responsive to energization by the opposite polarity signal to operate the associated signal lamps to display preselected indications irrespective of the operated position of said switching means.

6. In a traffic signal control system, at least one secondary controller having a timing means and a switching means for controlling the selective energization of a plurality of signal lamps, and control means operable between first and second conditions for operatively interconnecting said timing means and said switching means only when in said first condition for a predetermined interval, a master controller operatively connected to said secondary controller via a pair of wires, said master controller including means for transmitting a first control signal for operating said control means to its first and second conditions selectively and for transmitting a second control signal contemporaneously with said first signal for operating said switching means.

7. The system of claim 6 in which said master controller transmitting means contemporaneously transmits at times a third control signal for energizing a predetermined combination of said signal lamps irrespective of said switching means.

8. The system of claim 6 in which said first control signal comprises a direct-current energization of said pair of wires, and said second signal comprises brief periods of interruption of said direct-current energization, said secondary controller including first means responsive to said direct current energization for operating said control means to said second condition and responding only to de-energization longer than said predetermined interval for operating said control means to said first condition, said secondary controller also including means responsive to each said brief period of interruption of said energization for operating said switching means when said control means is in said second condition.

9. The system of claim 7 in which said first and second control signals comprise direct current of predetermined polarity and the intermittent interruption of said direct current, respectively, and said third signals comprise direct current of the opposite polarity.

10. The system of claim 7 in which said predetermined combination of signal lamps displays a stop indication to all directions of traffic.

11. The system of claim 5 wherein said control means comprises:
first switching circuit means responsive to said momentary removal of said one of said signals for operating said switching means;
second switching circuit means responsive to said one of said signals for rendering said switching means responsive to said first switching means, having a first timing circuit preventing said second switching means from being actuated by said momentary removals of said one of said signals for less than a first predetermined interval; and
third switching means responsive to said opposite polarity signal and having a second timing circuit for preventing said third switching means from being rendered unresponsive when said opposite polarity signal is momentarily removed for less than a second predetermined interval.

12. The system of claim 11 wherein the second and third switching means comprise relays and the first and second timing means comprise resistor-capacitor storage means, said storage means having a discharge time adapted to render the second and third circuit switching means unresponsive to momentary removals of signal for less than first and second predetermined intervals respectively.

References Cited

UNITED STATES PATENTS

| | | | |
|---|---|---|---|
| 3,078,442 | 2/1963 | Jeffers | 340—40 |
| 3,119,093 | 1/1964 | Willyard | 340—40 |
| 3,328,791 | 6/1967 | Casciato | 340—35 X |
| 3,206,721 | 9/1965 | Rudden et al. | 340—35 |

DONALD J. YUSKO, Primary Examiner

C. M. MARMELSTEIN, Assistant Examiner

U.S. Cl. X.R.

340—40